United States Patent Office 3,419,392
Patented Dec. 31, 1968

3,419,392
THIOETHER SILVER HALIDE DEVELOPMENT ACCELERATORS
John Martin Thompson, Eccles, England, assignor to Ilford Limited, Ilford, Essex, England, a British company
No Drawing. Filed Feb. 17, 1966, Ser. No. 528,055
Claims priority, application Great Britain, Feb. 24, 1965, 7,994/65; Jan. 5, 1966, 500/66
8 Claims. (Cl. 96—66.3)

ABSTRACT OF THE DISCLOSURE

Process of developing a silver halide latent image in the presence of a compound of the general formula:

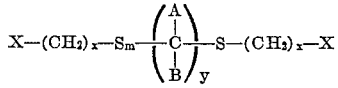

According to first feature of the present invention there is provided a process for the production of a developed photographic material which comprises subjecting a material containing a developable silver salt to development by means of a photographic developing agent in the presence of a compound of the general Formula I:

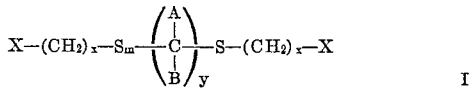
I where X represents —CN or —CONR$_1$R$_2$ in which R$_1$ and R$_2$ are the same or different and are hydrogen, lower alkyl, hydroxy lower alkyl, aryl, substituted aryl or R$_1$ is hydrogen and R$_2$ is —NH$_2$, $x$ is 1, 2, 3, 4 or 5, $y$ is 0 to 10 and $m$ is 0 or 1, $y$ being 0 when $m$ is 0 and being other than 0 when $m$ is 1, A and B when $y$ is 1 being the same or different and each representing hydrogen, lower alkyl, hydroxy lower alkyl, aryl or substituted aryl or one of A and B being hydrogen and the other a —S(CH$_2$)$_x$X group where $x$ and X have the meaning just assigned, and A and B, when $y$ is greater than 1 each being hydrogen.

The term "lower" alkyl is used to indicate an alkyl group of 1 to 6 carbon atoms, i.e., methyl, ethyl, propyl, butyl, amyl and hexyl and the isomeric forms of these groups. A suitable hydroxy lower alkyl group is, for example, β-hydroxy ethyl. Aryl groups when present are preferably phenyl groups or alkyl-substituted phenyl groups. Substituted aryl groups are, for example, chlorophenyl and hydroxy phenyl groups.

The compound of the foregoing Formula I may be prepared by various methods. The nitriles may be obtained directly from the appropriate nitrilo intermediates while the amides (X=—CONR$_1$R$_2$) may be readily obtained from the corresponding acids or their acid chlorides or lower alkyl esters. Thus the following methods are available for the preparation of the parent acids (the symbols having the meanings assigned to them above and the methods varying according to the value of the symbols):

Method 1.—When $m=0$ and $y=0$

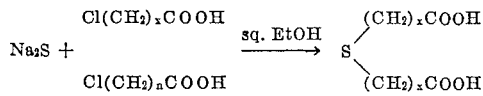

e.g. G. M. Bennett and L. V. D. Scorah, J.C.S., 1927, 194.
Method 2.—When $m=1$, $y=1$, A=H and B=H

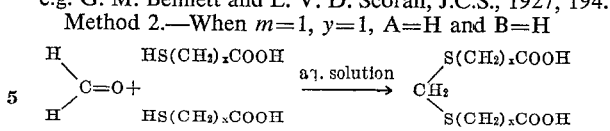

Use of other aldehydes and ketones gives various values of A and B eg. B. Holmberg and K. Mattisson, Ann., 1907, 353, 123.

A special example of this reaction constitutes Method 3.
Method 3.—When $m=1$, $y=1$, A=H and B=SCH$_2$X

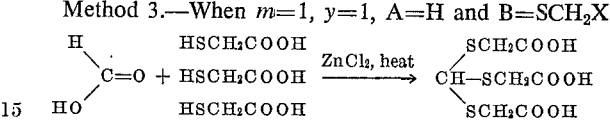

B. Holmberg, Ann., 1907, 353, 131.
Method 4.—When $m=1$, $y>1$, A=H and B=H

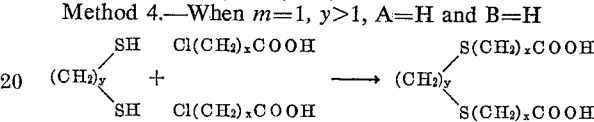

The dimercaptan is reacted as its sodium derivative.
Method 5 is an alternative to Method 4.
Method 5.—When $m=1$, $y>1$, A=H and B=H

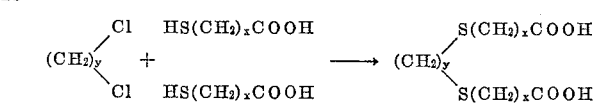

The mercapto acid is reacted as the sodium salt. Reference to both Methods 4 and 5 is made in, e.g. L. Ramberg and A. Tiberg, Ber., 1916, 47, 730.

The nitrile group may be substituted for the carboxylic acid group in these preparations, thereby directly to produce the compound of the foregoing Formula I.

In the production of the amides (X=—CONR$_1$R$_2$) the acid itself, produced as indicated above, or the corresponding acid chloride or lower alkyl ester, may be reacted with ammonia or an amine. These specific procedures, representing the whole acid as R·COOH, may be indicated thus:

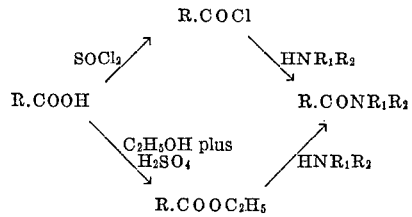

The method of preparing the hydrazides is by the well-known reaction between an ester and an aqueous solution of hydrazine hydrate, usually at room temperature.
This reaction can be represented by:

R·COOEt+NH$_2$·NH$_2$→R·CONH·NH$_2$

Table I lists compounds suitable for use in the invention. The column of Table 1 which is headed "Method of Preparation" refers to the preparation of the parent acids in the case of the amides and not to the amides themselves. The preparation of the amides from the acids may be effected by the methods indicated above, which present no special chemical problems.

TABLE 1.—COMPOUNDS SUITABLE FOR USE IN THE INVENTION

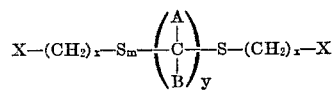

$$X-(CH_2)_x-S_m-\underset{(B)_y}{\overset{(A)}{C}}-S-(CH_2)_x-X$$

| | —X | $R_1$ | $R_2$ | x | y | m | A | B | M.P. (in °C.) | Analysis C | Analysis H | Analysis N | Analysis S | Method of Preparation |
|---|---|---|---|---|---|---|---|---|---|---|---|---|---|---|
| (1) | —CON⟨$R_1$/$R_2$ | H | H | 1 | 0 | 0 | ----- | ----- | ----- | Beilstein, 2, II, 184 | | | | 1 |
| (2) | —CON⟨$R_1$/$R_2$ | H | H | 1 | 1 | 1 | H | H | ----- | E.G. Howard and R. V. Lindsay J.A.C.S., 1960, 82, 158. | | | | 2 |
| (3) | —CON⟨$R_1$/$R_2$ | H | Me | 1 | 1 | 1 | H | H | 128–129 | [1] 38.0 [2] 37.7 | [1] 6.7 [2] 6.3 | [1] 12.3 [2] 12.6 | [1] 28.1 [2] 28.8 | 2 |
| (4) | —CON⟨$R_1$/$R_2$ | Me | Me | 1 | 1 | 1 | H | H | ----- | Uncrystallisable gum which was not analysed | | | | 2 |
| (5) | —CON⟨$R_1$/$R_2$ | H | $CH_2CH_2OH$ | 1 | 1 | 1 | H | H | 114–116 | [1] 38.2 [2] 38.4 | [1] 6.4 [2] 6.3 | [1] 9.3 [2] 10.0 | [1] 21.6 [2] 22.6 | 2 |
| (6) | —CON⟨$R_1$/$R_2$ | H | H | 1 | 1 | 1 | H | —$SCH_2X$ | 181–182 | [1] 30.1 [2] 29.7 | [1] 5.7 [2] 4.5 | [1] 14.6 [2] 14.6 | [1] 33.5 [2] 34.0 | 3 |
| (7) | —CON⟨$R_1$/$R_2$ | H | Me | 1 | 1 | 1 | H | —$SCH_2X$ | 142 | [1] 36.8 [2] 37.0 | [1] 6.3 [2] 5.8 | [1] 12.3 [2] 12.8 | ----- | 3 |
| (8) | CON⟨$R_1$/$R_2$ | Me | Me | 1 | 1 | 1 | H | —$SCH_2X$ | ----- | Uncrystallisable gum which was not analysed | | | | 3 |
| (9) | —CON⟨$R_1$/$R_2$ | H | $CH_2CH_2OH$ | 1 | 1 | 1 | H | —$SCH_2X$ | 94–96 | [1] 37.8 [2] 37.5 | [1] 5.6 [2] 6.0 | [1] 9.9 [2] 10.1 | [1] 22.4 [2] 23.2 | 3 |
| (10) | —CON⟨$R_1$/$R_2$ | H | H | 1 | 2 | 1 | H | H | ----- | Beilstein, 3, I, 98 | | | | 5 |
| (11) | —CON⟨$R_1$/$R_2$ | H | Me | 1 | 2 | 1 | H | H | 140–142 | [1] 40.5 [2] 40.6 | [1] 7.1 [2] 6.8 | [1] 11.6 [2] 11.8 | [1] 27.2 [2] 27.0 | 5 |
| (12) | —CON⟨$R_1$/$R_2$ | H | H | 2 | 0 | 0 | ----- | ----- | ----- | Beilstein, 3, II, 215 | | | | 1 |
| (13) | —CON⟨$R_1$/$R_2$ | H | Me | 2 | 0 | 0 | ----- | ----- | 132–134 | ----- | ----- | ----- | ----- | 1 |
| (14) | —CON⟨$R_1$/$R_2$ | Me | Me | 2 | 0 | 0 | ----- | ----- | ----- | Uncrystallisable gum which was not analysed | | | | 1 |

TABLE I—Continued

| —X | $R_1$ | $R_2$ | x | y | m | A | B | M.P. (in °C.) | Analysis C | Analysis H | Analysis N | Analysis S | Method of Preparation |
|---|---|---|---|---|---|---|---|---|---|---|---|---|---|
| (15) —CON$<^{R_1}_{R_2}$ | H | CH$_2$CH$_2$OH | 2 | 0 | 0 | ----- | ----- | 133–134 | $^1$ 45.9 $^2$ 43.8 | $^1$ 7.8 $^2$ 7.6 | $^1$ 10.5 $^2$ 10.2 | $^1$ 12.2 $^2$ 11.8 | 1 |
| (16) —CN | ----- | ----- | 2 | 0 | 0 | ----- | ----- | ----- | Commercially available | | | | 1 |
| (17) —CON$<^{R_1}_{R_2}$ | Me | Me | 1 | 2 | 1 | H | H | ----- | Uncrystallisable gum which was not analysed | | | | 5 |
| (18) —CON$<^{R_1}_{R_2}$ | H | H | 1 | 1 | 1 | H | Me | 162–163 (Note 1) | $^1$ 35.4 $^2$ 34.7 | $^1$ 5.8 $^2$ 5.8 | $^1$ 13.1 $^2$ 13.5 | $^1$ 31.2 $^2$ 30.8 | 2 |
| (19) —CON$<^{R_1}_{R_2}$ | H | H | 1 | 1 | 1 | Me | Me | 162–164 (Note 2) | $^1$ 37.9 $^2$ 37.9 | $^1$ 6.4 $^2$ 6.3 | $^1$ 12.4 $^2$ 12.6 | $^1$ 28.3 $^2$ 28.8 | 2 |
| (20) —CON$<^{R_1}_{R_2}$ | H | H | 1 | 1 | 1 | H | Ph | 121 | $^1$ 48.2 $^2$ 48.8 | $^1$ 5.4 $^2$ 5.2 | $^1$ 10.2 $^2$ 10.4 | $^1$ 23.3 $^2$ 23.7 | 2 |
| (21) —CON$<^{R_1}_{R_2}$ | H | Me | 1 | 1 | 1 | H | Me | 90–92 | $^1$ 40.6 $^2$ 40.6 | $^1$ 7.4 $^2$ 6.8 | $^1$ 11.7 $^2$ 11.9 | $^1$ 27.2 $^2$ 27.1 | 2 |
| (22) —CON$<^{R_1}_{R_2}$ | H | Me | 1 | 1 | 1 | Me | Me | 112–114 | $^1$ 42.7 $^2$ 43.2 | $^1$ 7.3 $^2$ 7.2 | $^1$ 10.9 $^2$ 11.2 | $^1$ 25.2 $^2$ 25.6 | 2 |
| (23) —CON$<^{R_1}_{R_2}$ | H | Ph | 2 | 0 | 0 | ----- | ----- | 165–166 | $^1$ 65.7 $^2$ 65.7 | $^1$ 6.2 $^2$ 6.1 | $^1$ 8.3 $^2$ 8.5 | $^1$ 9.9 $^2$ 9.8 | 1 |
| (24) —CON$<^{R_1}_{R_2}$ | H | Me | 1 | 10 | 1 | ----- | ----- | 122 | $^1$ 55.5 $^2$ 55.2 | $^1$ 9.2 $^2$ 9.2 | $^1$ 7.8 $^2$ 8.0 | $^1$ 18.1 $^2$ 18.4 | 5 |
| (25) —CN | ----- | ----- | 1 | 2 | 1 | ----- | ----- | 80 | $^1$ 42.5 $^2$ 41.9 | $^1$ 4.6 $^2$ 4.7 | ----- | $^1$ 36.8 $^2$ 37.2 | 4 |
| (26) —CN | ----- | ----- | 2 | 2 | 1 | ----- | ----- | 91–92 | Beilstein, 3, EII, 21 | | | | 4 |
| (27) —CON$<^{R_1}_{R_2}$ | H | NH$_2$ | 2 | 0 | 0 | ----- | ----- | 156 | $^1$ 34.6 $^2$ 34.9 | $^1$ 7.3 $^2$ 6.8 | $^1$ 27.2 $^2$ 27.2 | $^1$ 15.4 $^2$ 15.4 | 1 |
| (28) CON$<^{R_1}_{R_2}$ | H | NH$_2$ | 1 | 1 | 1 | H | H | 113 | $^1$ 26.8 $^2$ 26.8 | $^1$ 6.0 $^2$ 5.4 | $^1$ 24.4 $^2$ 25.0 | $^1$ 29.2 $^2$ 28.6 | 2 |
| (29) —CON$<^{R_1}_{R_2}$ | H | NH$_2$ | 1 | 2 | 1 | H | H | 103–4 | $^1$ 30.9 $^2$ 30.3 | $^1$ 6.7 $^2$ 5.9 | ----- | $^1$ 26.8 $^2$ 26.9 | 5 |

$^1$ Found.   $^2$ Required.

NOTE 1.—Shigetashi Wakaki, Tsutance Asahina and Yojiro Tohmon (J. Agr. Chem. Soc., Japan 1954, 28, 174; C.A. 1956, 50, 5986), give M.P. 155° or this compound.

NOTE 2.—The reference of Note 1 gives M.P. 161° for this compound.

It has been found that the presence of a compound of the said Formula I has a striking effect on photographic development in that when such a compound is present the time taken for development to a given density is much reduced. Specifically, when a photographic gelatino silver halide material, given a standard exposure, is developed to achieve a particular silver density in the exposed area then the development time taken to achieve that density is substantially reduced by the presence of the said compound.

Since one way of providing that a compound of Formula I is present during development of the photographic material is to provide that the said compound is included in the photographic material itself, the invention further includes novel photographic materials which comprise in a layer of the photographic material a compound of the general Formula I.

When the compound is included in the photographic material itself, it may be present in a light sensitive layer, e.g., a gelatino silver halide emulsion layer, or in any other layer of the photographic material, e.g., a sub-coat, supercoat or filter or antihalation layer. The photographic material may be of a type adapted to be developed to yield colour images by reason of the presence of colour couplers in the photographic material itself or in a photographic developer used therewith.

The compound of the foregoing formula may alternatively be caused to be present during the development step by including it in the developer composition which is used or by treating the photographic material with a bath containing the compound before the development step.

The invention is of value both in the production of photographic records in black and white, and in the production of photographic colour records. Its optimum point of use in the colour processing sequence will depend on the specific sequence employed. Thus where the photographic material is intended to be processed by a reversal procedure, i.e., the image-wise exposed material is first developed to give a silver image, the residual silver salt is rendered developable and the material is then developed in a second developer which image-wise develops a dye in the material (utilising colour couplers present in the photographic material or in the second developer) the compound of general Formula I is preferably included in the first or so-called "reversal" developer.

In processes where the photographic material is designed to be directly developed to yield a colour image (utilising colour couplers present in the photograhic material or in the colour developer) the compound of the foregoing Formula I is preferably included in the colour developer.

The term colour developer is used herein to mean an aromatic primary amino colour developing agent. Such compounds are normally N,N-di substituted-p-phenylene diamines or homologues thereof.

The quantities of the compound of general Formula I required to produce the optimum effect required vary from compound to compound. The optimum quantity for use in a developer solution either for colour or black and white materials lies normally within the range 0.0001 g. mol./litre to 0.5 g. mol./litre. When used as emulsion additives, the optimum quantities usually lie within the range 0.0001 to 0.5 g. mol./g. mol. of silver halide present in the emulsion.

The presence of a compound of general Formula I is found to have no deleterious effect on the coloured images obtained by either of the foregoing processes. Whilst the effect of the compounds is essentially to accelerate the development, it is possible by variations in conditions to utilise the effect of the compounds to establish desired variance in developed contrast or effective speed of the photographic sensitive layers. Moreover, advantage may be taken of the accelerative effect to reduce the quantity of silver present in the photographic emulsion, the same end result being achieved by the more effective utilisation of the reduced silver content, and this is, of course, an important economic advantage.

The use of compounds of general Formula I makes possible the use of developers of inherently lower activity, thus making available a wider choice of developing substances of lower cost, higher solubility, lower toxicity and affording lower amounts of stain.

The following examples will serve to illustrate the invention:

EXAMPLE 1

A colour photographic material constructed essentially as follows was employed:

(a) Blue-sensitive gelatino silver halide emulsion containing a colour coupler adapted to couple to yield a yellow dye.

(b) Green-sensitized gelatino silver halide emulsion containing colour coupler adapted to couple to yield a magenta dye.

(c) Red-sensitized gelatino silver halide emulsion containing a colour coupler adapted to couple to yield a cyan dye.

(d) Paper support layer.

A photographic colour print paper having a construction essentially as set out above, the layers (b) and (c) being gelatino silver chlorobromide emulsions, and with the emulsion layers and colour couplers designed to afford a good colour print material (such products being commercially available) was exposed to a colour negative transparency and developed in the following developers.

DEVELOPER 1

| | Gram |
|---|---|
| Sodium hexametaphosphate | 2.0 |
| Trisodium citrate | 4.0 |
| Sodium metaborate | 53.0 |
| Sodium sulphite anhydrous | 4.0 |
| Potassium bromide | 1.0 |
| Sodium sulphate | 8.0 |
| Hydroxylamine hydrochloride | 2.0 |
| N-ethyl-N($\omega$-hydroxy pentyl)-p-phenylene diamine acid sulphate | 5.8 |
| Water to 1 litre. | |

DEVELOPER 2

| | Gram |
|---|---|
| Disodium salt of ethylene diamine tetraacetic acid | 1.0 |
| Sodium sulphite anhydrous | 4.0 |
| Sodium carbonate | 70.0 |
| Potassium bromide | 1.0 |
| Hydroxylamine hydrochloride | 2.0 |
| N-ethyl-N-(2-hydroxyethyl)-p-phenylene diamine | 4.5 |
| Water to 1 litre. | |

DEVELOPER 3

| | Gram |
|---|---|
| Disodium salt of ethylene diamine tetraacetic acid | 1.0 |
| Sodium sulphite anhydrous | 2.0 |
| Sodium carbonate | 70.0 |
| Potassium bromide | 1.0 |
| Hydroxylamine hydrochloride | 2.0 |
| N-ethyl-N-(2-hydroxyethyl)-p-phenylene diamine | 4.5 |
| Water to 1 litre. | |

To these developers were added various quantities of compounds of general Formula I, as identified by the numbers assigned to them in the foregoing Table I.

The sensitometric results obtained are set out in Table II the times given being the times required to reach standard characteristics for a given exposure level. It will be noted that fog levels are not materially increased by the presence of the compound of Formula I.

TABLE II.—COLOUR PAPER DEVELOPMENT

| Compound No. | Quantity, g.-mol/l. | Time of Development, mins. | Fog | | | Relative Log Speed at Density 0.8 on the Characteristic Curve | | | Developer Used |
| --- | --- | --- | --- | --- | --- | --- | --- | --- | --- |
| | | | B | G | R | | | | |
| Control | 0 | 8 | .08 | .05 | .06 | 1.81 | 1.74 | 1.67 | 1 |
| 2 | 0.01 | 6 | .08 | .06 | .05 | 1.78 | 1.73 | 1.64 | 1 |
| 3 | 0.01 | 6 | .08 | .05 | .06 | 1.78 | 1.72 | 1.65 | 1 |
| 4 | 0.01 | 6 | .08 | .06 | .06 | 1.77 | 1.71 | 1.64 | 1 |
| 8 | 0.01 | 6 | .10 | .06 | .06 | 1.77 | 1.75 | 1.69 | 1 |
| 10 | 0.01 | 6 | .09 | .06 | .06 | 1.81 | 1.79 | 1.71 | 1 |
| 11 | 0.01 | 6 | .10 | .07 | .07 | 1.88 | 1.85 | 1.77 | 1 |
| 12 | 0.039 | 6 | .06 | .03 | .04 | 1.82 | 1.80 | 1.75 | 1 |
| 13 | 0.01 | 6 | .12 | .09 | .09 | 1.78 | 1.73 | 1.67 | 1 |
| 16 | 0.05 | 6 | .07 | .04 | .05 | 1.77 | 1.75 | 1.67 | 1 |
| Control | 0 | 12 | .10 | .05 | .05 | 1.75 | 1.77 | 1.75 | 3 |
| 18 | <0.01 | 10 | .10 | .06 | .06 | 1.73 | 1.78 | 1.75 | 3 |
| 21 | 0.04 | 8 | .08 | .03 | .03 | 1.70 | 1.78 | 1.76 | 3 |
| Control | 0 | 12 | .10 | .05 | .05 | 1.92 | 1.90 | 1.88 | 2 |
| 25 | 0.01 | 8 | .10 | .05 | .06 | 1.84 | 1.96 | 1.88 | 2 |
| 26 | 0.01 | 9 | .10 | .05 | .05 | 1.87 | 1.90 | 1.86 | 2 |
| Control | | 12 | .09 | .04 | .04 | 1.85 | 1.77 | 1.77 | 2 |
| 27 | .01 | 9 | .10 | .06 | .06 | 1.83 | 1.78 | 1.78 | 2 |
| | .02 | 8 | .08 | .03 | .03 | 1.80 | 1.80 | 1.79 | 2 |
| 28 | .01 | 9 | .09 | .04 | .04 | 1.79 | 1.88 | 1.83 | 2 |
| Control | | 12 | .10 | .05 | .05 | 1.92 | 1.83 | 1.81 | 2 |
| 29 | .01 | 7 | .14 | .12 | .10 | 2.04 | 2.11 | 2.02 | 2 |
| | .005 | 7 | .11 | .08 | .07 | 1.88 | 1.95 | 1.88 | 2 |
| | .002 | 7 | .08 | .03 | .03 | 1.76 | 1.82 | 1.76 | 2 |

EXAMPLE II

A film of the general construction indicated in Example 1 (but using a film support, having a yellow filter layer between layers (a) and (b), and being designed as a camera material of speed ASA 64) was processed by the reversal method as follows:

The exposed film was first developed in the following Developer A:

DEVELOPER A

| | G. |
| --- | --- |
| 1-phenyl-3-pyrazolidone | 0.6 |
| Sodium sulphite (anhydrous) | 50 |
| Hydroquinone | 6.0 |
| Sodium metaborate | 20 |
| Potassium bromide | 2.0 |
| Potassium thiocyanate | 1.5 |
| Benztriazole | 0.4 |
| Water to make 1 l. | |

The film was then put in a hardener bath for 2 minutes, washed for 5 minutes and re-exposed for 10 seconds with photoflood light. It was then colour developed in the following developer for 10 minutes at 20° C.

DEVELOPER B

| | G. |
| --- | --- |
| Sodium hexametaphosphate | 2.0 |
| Trisodium phosphate | 80 |
| Hydroxylamine sulphate | 2.4 |
| Sodium sulphite (anhydrous) | 4.0 |
| Potassium bromide | 0.5 |
| N-ethyl-N-hydroxyethyl p.phenylene diamine acid sulphate | 7.8 |
| Water to make 1 l. | |

The film was then put in a stop hardener bath for 3 minutes, washed for 3 minutes, bleached for 3 minutes, washed for 3 minutes, fixed for 4 minutes, and finally washed for 3 minutes, in the normal manner.

Various quantities of compounds of general Formula I were added to Developer A and the effects obtained are shown in the following Table III. The times noted are those required to reach a close match with the characteristics obtained by the control processing, for a given exposure level:

TABLE III.—REVERSAL DEVELOPMENT

| Compound | Quantity, g.-mol/l. | Time of Development, min. | Fog | | |
| --- | --- | --- | --- | --- | --- |
| | | | B | G | R |
| Control | 0 | 16 | .17 | .17 | .15 |
| 2 | 0.05 | 14 | .18 | .15 | .12 |
| 3 | 0.02 | 10 | .18 | .19 | .20 |
| 10 | 0.02 | 12 | .18 | .18 | .20 |
| 12 | 0.02 | 12 | .16 | .14 | .15 |
| 16 | 0.02 | 8 | .16 | .14 | .10 |

EXAMPLE III

Use of the compounds as emulsion additives

To a standard non-optically sensitised silver halide emulsion, a quantity of Compound 10, Table 1 is added. The quantity of compound is best taken in the proportion of 0.067 g. mol. per mol. of silver halide. To the emulsion is then added a suitable quantity of a solubilised long chain magenta colour former such as one of those described in British Patent No. 830,797. The emulsion is then coated on a paper support and the photographic element thus obtained is exposed and processed in the usual way for a paper containing a substantive colour former. By comparison with a control emulsion coating not containing the development accelerator it is found that for the same exposure level the additive reduces the required developing time to two-thirds of standard.

EXAMPLE IV

Use of compounds as emulsion additives

To a standard red-hot sensitised negative emulsion a quantity of compound 25, Table I, was added as indicated in Table IV. To the emulsion was then added a suitable quantity of a solubilised long chain cyan colour former (Example 5 of British patent specification Ser. No. 723,171). The emulsion was then coated on a transparent film support and the photographic element thus obtained was exposed and processed in the usual way for a negative film containing a colour former. The results obtained are listed in Table IV.

Results are also given for the case when Compound 26 is substituted for Compound 25 at one-fifth of the latter's molar concentration.

TABLE IV.—USE OF COMPOUNDS AS EMULSION ADDITIVES

| Compound | Colour Development Time, min. | Quantity g.-mol/mol of silver | Fog B | Fog G | Fog R | Cyan $D_{max}$ | Red Speed |
|---|---|---|---|---|---|---|---|
| Control | 12 | 0 | 0.16 | 0.09 | 0.23 | 1.60 | 2.60 |
| 25 | 12 | 0.067 | 0.17 | 0.09 | 0.25 | 1.87 | 2.77 |
| 26 | 12 | 0.0133 | 0.17 | 0.09 | 0.25 | 2.00 | 2.63 |
| Control | 8 | 0 | 0.15 | 0.08 | 0.20 | 1.23 | 2.35 |
| 25 | 8 | 0.067 | 0.16 | 0.09 | 0.22 | 1.41 | 2.47 |
| 26 | 8 | 0.0133 | 0.16 | 0.08 | 0.20 | 1.74 | 2.44 |

EXAMPLE V

Use of compounds in black and white developers

Standard X-ray films used for medical work are exposed and developed with limited agitation in a developer of the following formula:

Sodium sulphite anhydrous _____g__ 120
Potassium sulphite anhydrous _____g__ 110
Sodium metaborate crystalline _____g__ 90
Hydroquinone _____g__ 90
1-phenyl-3-pyrazolidinone _____g__ 2.6
Sodium hydroxide _____g__ 20
E.D.T.A. sodium salt _____g__ 3.5
6-nitrobenzimidazole _____g__ 0.3
Potassium bromide _____g__ 52
Water to make up to 5 litres.
pH _____ 10.5

The films were then fixed and washed in the normal manner 0.01 g. mol./litre of Compound 3 of Table 1 were added to the developer in another experiment and the results compared to the control experiment are shown in Table V.

TABLE V

| Compound | Development Time, min. | Temperature of Developer, °F. | Fog | Speed at S 0.1 | Speed at S 1.0 |
|---|---|---|---|---|---|
| Control | 4 | 68 | 0.04 | 4.05 | 3.44 |
| 3 | 4 | 68 | 0.06 | 4.11 | 3.57 |
| Control | 2 | 80 | 0.04 | 4.18 | 3.58 |
| 3 | 2 | 80 | 0.06 | 4.27 | 3.66 |

The above Table V shows the increased speed at densities of 0.1 and 1.0 above fog density achieved by using Compound 3 at a concentration of 0.01 g. mol. per litre in a typical X-ray film developer.

I claim as my invention:

1. In a process for the production of a developed photographic material by subjecting a material containing a developable silver halide latent image to development by means of a photographic developing agent, the improvement comprising developing said silver salt by said photographic developing agent in the presence of at least one compound of the formula:

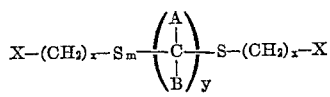

wherein X is selected from the group consisting of —CN and —CONR₁R₂ radicals wherein R₁ and R₂ are each independently selected from the group consisting of hydrogen, lower alkyl, hydroxy lower alkyl, aryl, and substituted aryl, or R₁ is hydrogen and R₂ is —NH₂, x is a positive integer of from 1 to 5, y is an integer of 0 to 10 and m is 0 or 1, wherein y is 0 when m is 0 and y is other than 0 when m is 1, and when y is 1, A and B are each independently selected from the group consisting of hydrogen, lower alkyl, hydroxy lower alkyl, aryl, and substituted aryl, or one of A and B is hydrogen and the other is an —S(CH₂)ₓX group, and A and B are each hydrogen when y is greater than 1.

2. A process according to claim 1 wherein the compound of the formula therein defined is present in the photographic developer.

3. A process according to claim 1 wherein the compound of the formula defined therein is present in a gelatino-silver halide emulsion layer of the exposed photographic material.

4. In a process for the production of a developed photographic material by subjecting a material containing a developable silver halide latent image to development by means of a photographic developing agent, the improvement comprising developing said silver salt by said photographic developing agent in the presence of at least one compound of the formula:

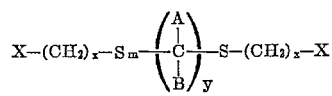

wherein X is selected from the group consisting of —CN and —CONR₁R₂ radicals wherein R₁ and R₂ are each independently selected from the group consisting of hydrogen, lower alkyl, hydroxy lower alkyl, aryl, and substitute aryl, x is a positive integer of from 1 to 5, y is an integer of 0 to 10 and m is 0 or 1, wherein y is 0 when m is 0 and y is other than 0 when m is 1, and when y is 1, A and B are each independently selected from the group consisting of hydrogen, lower alkyl, hydroxy lower alkyl, aryl, and substituted aryl, or one of A and B is hydrogen and the other is an —S(CH₂)ₓX group, and A and B are each hydrogen when y is greater than 1.

5. A photographic developer solution containing a silver halide developer and 0.0001 to 0.5 g. mol./liter of developer solution of at least one compound of the formula:

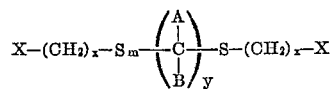

wherein X is selected from the group consisting of —CN and —CONR₁R₂ radicals wherein R₁ and R₂ are each independently selected from the group consisting of hydrogen, lower alkyl, hydroxy lower alkyl, aryl, and substituted aryl, or R₁ is hydrogen and R₂ is —NH₂, x is a positive integer of from 1 to 5, y is an integer of 0 to 10 and m is 0 or 1, wherein y is 0 when m is 0 and y is other than 0 when m is 1, and when y is 1, A and B are each independently selected from the group consisting of hydrogen, lower alkyl, hydroxy lower alkyl, aryl, and substituted aryl, or one of A and B is hydrogen and the other is an —S(CH₂)ₓX group, and A and B are each hydrogen when y is greater than 1.

6. A photographic developer solution containing a silver halide developer and 0.0001 to 0.5 g. mol./liter of developer solution of at least one compound of the formula:

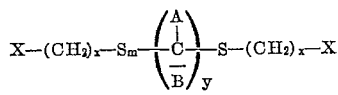

wherein X is selected from the group consisting of —CN and —CONR₁R₂ radicals wherein R₁ and R₂ are each independently selected from the group consisting of hydrogen, lower alkyl, hydroxy lower alkyl, aryl, and substitute aryl, x is a positive integer of from 1 to 5, y is an integer of 0 to 10 and m is 0 or 1, wherein y is 0 when m is 0 and y is other than 0 when m is 1, and when y is 1, A and B are each independently selected from the group consisting of hydrogen, lower alkyl, hydroxy lower alkyl, aryl, and substituted aryl, or one of A and B is hydrogen and the other is an —S(CH$_2$)$_x$X group, and A and B are each hydrogen when y is greater than 1.

7. A photographic gelatino silver halide emulsion containing 0.0001 to 0.5 g. mol./g. mol. of silver halide present in the emulsion of at least one compound of the formula:

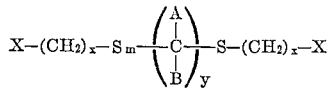

wherein X is selected from the group consisting of —CN and —CONR$_1$R$_2$ radicals wherein R$_1$ and R$_2$ are each independently selected from the group consisting of hydrogen, lower alkyl, hydroxy lower alkyl, aryl, and substituted aryl, or R$_1$ is hydrogen and R$_2$ is —NH$_2$, x is a positive integer of from 1 to 5, y is an integer of 0 to 10 and m is 0 or 1, wherein y is 0 when m is 0 and y is other than 0 when m is 1, and when y is 1, A and B are each independently selected from the group consisting of hydrogen, lower alkyl, hydroxy lower alkyl, aryl, and substituted aryl, or one of A and B is hydrogen and the other is an —S(CH$_2$)$_x$X group, and A and B are each hydrogen when y is greater than 1.

8. A photographic gelatino silver halide emulsion containing 0.0001 to 0.5 g. mol./g. mol. of silver halide present in the emulsion of at least one compound of the formula:

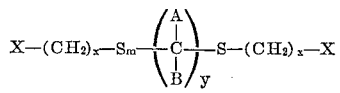

wherein X is selected from the group consisting of —CN and —CONR$_1$R$_2$ radicals wherein R$_1$ and R$_2$ are each independently selected from the group consisting of hydrogen, lower alkyl, hydroxy lower alkyl, aryl, and substitute aryl, x is a positive integer of from 1 to 5, y is an integer of 0 to 10 and m is 0 or 1, wherein y is 0 when m is 0 and y is other than 0 when m is 1, and when y is 1, A and B are each independently selected from the group consisting of hydrogen, lower alkyl, hydroxy lower alkyl, aryl, and substituted aryl, or one of A and B is hydrogen and the other is an —S(CH$_2$)$_x$X group, and A and B are each hydrogen when y is greater than 1.

References Cited

UNITED STATES PATENTS

| | | | |
|---|---|---|---|
| 2,739,060 | 3/1956 | Lowe et al. | 96—107 |
| 3,021,215 | 2/1962 | Williams et al. | 96—107 |
| 3,057,724 | 10/1962 | Lovett et al. | 96—107 |
| 3,201,242 | 8/1965 | Schwan | 96—66.3 |

NORMAN G. TORCHIN, *Primary Examiner.*

CAROLYN E. DAVIS, *Assistant Examiner.*

U.S. Cl. X.R.

96—95, 107